No. 786,549. PATENTED APR. 4, 1905.
L. DION.
FILTER AND MECHANISM FOR CLEANING IT.
APPLICATION FILED JUNE 3, 1904.

Witnesses
N. G. Douglas
J. S. Curry

Inventor,
Léon Dion,
By his Attorney Appleton

No. 786,549. Patented April 4, 1905.

UNITED STATES PATENT OFFICE.

LÉON DION, OF NEW YORK, N. Y., ASSIGNOR TO THE AMERICUS ELECTRO-HERMATIC COMPANY, OF NEW YORK, N. Y., A CORPORATION OF ARIZONA TERRITORY.

FILTER AND MECHANISM FOR CLEANING IT.

SPECIFICATION forming part of Letters Patent No. 786,549, dated April 4, 1905.

Application filed June 3, 1904. Serial No. 210,982.

*To all whom it may concern:*

Be it known that I, LÉON DION, a citizen of the United States, and a resident of the borough of Manhattan, in the city, county, and State of New York, have invented certain new and useful Improvements in Filters and Mechanism for Cleaning Them, of which the following is a specification.

My invention, while capable of use in places where the filtration of water and other liquids is required generally, is especially useful in connection with apparatus in which liquids, and more particularly the water from mines and mineral springs, are subjected to the action of an electric current to recover the metals and other substances separated out from them by such current, although not restricted thereto, the object of the invention being to provide a filter and cleaner of this general class which, while simple in construction and not liable to get out of order, shall at the same time be efficient in operation.

To these ends the invention consists in the construction and novel combination of the filter, the cleaning devices therefor, and the chamber in which they are arranged, all as hereinafter described, and pointed out in the subjoined claims.

Figure 1:
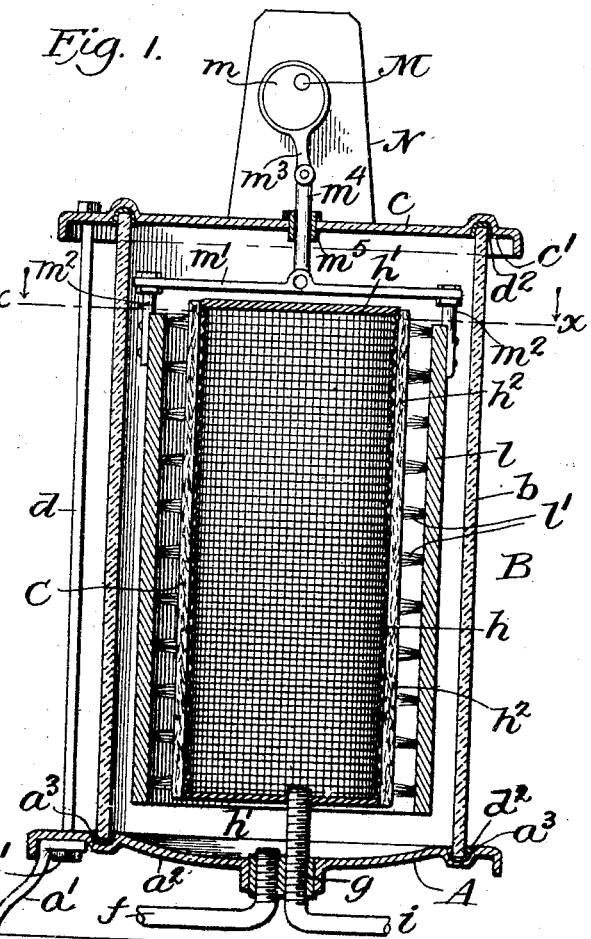
Figure 2:
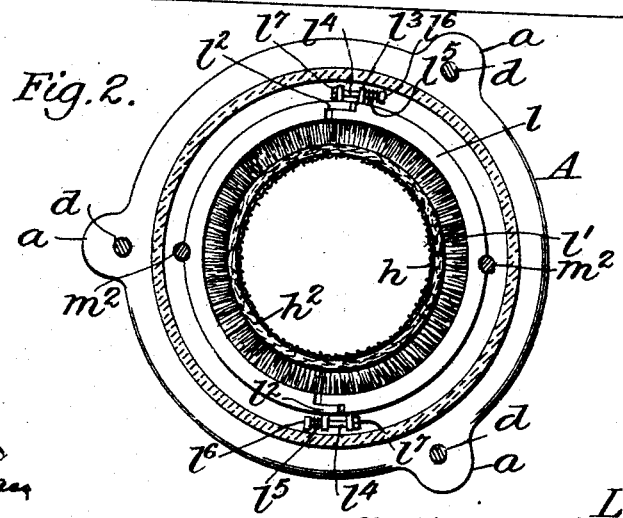

Referring to the accompanying drawings, which form a part of this specification, Figure 1 is a vertical axial section of a filter, a filter-chamber, and filter-cleaning mechanism constructed in accordance with my invention; and Fig. 2, a transverse horizontal section of the same, taken in the plane $x$ $x$ of Fig. 1.

In both figures like letters of reference are employed to designate corresponding parts.

A indicates a base-plate, in and upon which the various parts of the apparatus are or may be mounted. This base-plate may be constructed in various forms. As shown in the drawings, however, it is constructed in circular contour with a number of ears $a$ projecting from its circumference and is or may be supported upon suitable legs $a'$, with a depression $a^2$ formed in it, which is or may be of the shape of a segment of a sphere. As thus constructed it is likewise provided with an annular groove $a^3$, formed around the depression $a^2$ for reception of the lower end of a hollow cylindrical body $b$, which is arranged therein. This hollow cylindrical body, which may be constructed of any appropriate material, is here shown as constructed of glass or other vitrified substance and receives upon its upper end a top plate $c$, which is or may be constructed in approximately the same form as the base-plate A or otherwise and is provided in its under side with an annular groove $c'$, in which is seated the upper end of the hollow cylindrical body $b$. The hollow cylindrical body $b$ being thus disposed between the base-plate A and top plate $c$ is held and firmly clamped in that relationship by appropriate tie-rods $d$, which, passing through coinciding orifices formed through the top plate $c$ and the ears $a$ on the base-plate A, are provided on their lower ends with nuts $d'$ with a suitable liquid-proof and, if desired, insulating packing $d^2$ interposed between its upper and lower ends and the top and base plates, respectively, if required.

With the parts constructed and combined as above explained an inclosed chamber or vessel B is produced which I term herein a "filter-chamber" and into which the liquid to be filtered may be delivered from an appropriate source of supply through an inlet-pipe $f$, which extends upward through a plug $g$, secured in the base-plate A.

Located within the filter-chamber B is the filter C, which may be constructed in various forms. In the drawings, however, I have shown it as composed of a cylindrical body portion $h$, which is made up from wire-gauze or other foraminated or reticulated material supported at its ends upon suitable heads $h'$, with a layer or layers of felt or other appropriate filtering material $h^2$ applied to its exterior. As thus constructed this filter is preferably supported upon a vertical axis within the filter-chamber in approximately concentric relationship to the annular portion thereof and receives the liquid supplied to the filter-chamber B upon its exterior and discharges the same, after having filtered it, from its interior through an appropriate discharge-pipe $i$, which leads downward from its lower end through the plug $g$ in the base-plate A and thence extends to the point of discharge. For supporting the filter C in this relationship various means may be employed. In the form of the invention which I have selected for purposes of illustration, however, it is supported upon the upper end of the discharge-pipe $i$, which extends upward a sufficient distance above the base-plate A and enters a suitable orifice formed in the lower head $h'$ of such filter.

With the parts constructed as thus described the liquid supplied to the interior of the filter-chamber B through the inlet-pipe $f$ will rise in the filter-chamber and coming in contact with the layers of felt or other filtering material forming a part of the filter will pass through the same into the interior thereof, from which it will flow, after having been thus purified, through the discharge-pipe $i$ to the point of discharge. In thus passing through this filter-surface any particles of metal or other foreign substances held in mechanical suspension in the liquid will be arrested thereby and will accumulate on the exterior surfaces thereof unless means are provided to prevent them from so doing. In order, therefore, to provide for the removal of these particles from the exterior of the filter-surfaces, I make use of cleaning devices. These cleaning devices are preferably constructed in the form of brushes, with the backs or supports $l$ for the bristles $l'$ of a form to extend around the filter from near its upper to near its lower end and with the groups of bristles $l'$ disposed in parallel horizontal rows around the interior of the back or support at the proper distance apart from its upper to its lower end and projecting inward from the inner surface thereof. In some instances this back or support $l$ may be made integral throughout. I prefer, however, to construct it in a plurality of longitudinally-divided sections, as shown in Fig. 2, as thereby provision is made to take up any wear that may be occasioned to the bristles, while at the same time holding the bristles in yielding contact with the filter-surfaces. To this end I construct these sections of the back or support $l$ with notched overlapping edges $l^2$, as shown in Fig. 2, and provide the adjacent edges of the sections with projecting lugs $l^3$, through suitable orifices in which is passed a bolt $l^4$, with the spring $l^5$ interposed between one of these lugs $l^3$ and the head $l^6$ of the bolt, the other end of the bolt $l^6$ being provided with an appropriate nut $l^7$. As thus constructed the inner ends of the groups of bristles $l'$ are held in contact with the surfaces of the filter by a yielding pressure, and in order to impart the cleaning action thereto a vertical reciprocating motion to the brush is necessary. For imparting this reciprocating motion thereto I make use of an eccentric $m$, which is fixedly secured upon a shaft M and is connected with the brush through the intervention of an eccentric-strap $m^3$, which encircles at its upper end the eccentric and is jointed at its lower end to the upper end of a rod $m^4$, which in turn is connected at its lower end with the brush and is fitted to slide in a suitable bearing $m^5$, formed in the top plate $c$. Instead of the lower end of this rod $m^4$ connecting directly with the brush, however, this connection is preferably made through the intermediary of a bridge-piece $m'$, which extends across the upper end of the brush and is held in that position by rods $m^2$, extending upward from the back $l$ of the brush, through orifices in the ends of the bridge-piece, with the lower end of the rod $m^4$ connected with this bridge-piece near the center thereof, as shown. By this means, as will be seen, the vertical reciprocation of the brush over the filter-surface will be effected by rotating the shaft M, and the limits of its travel will be such as to insure of the bristles of one row overlapping the end portions of the travel of the others as they are moved back and forth in their reciprocation.

For supporting the shaft M, whereby to permit of its rotation when desired, various means may be employed. In the exemplification of the invention illustrated in the drawings, however, it is shown supported in suitable brackets N, which may be secured to the top plate $c$ or other convenient support; but this arrangement is merely illustrative, and any other form of support and any other arrangement of the same may be adopted, as preferred.

With the apparatus constructed as above described and with the shaft M rotated and the liquid to be treated admitted to the filter-chamber through the inlet-pipe $f$ the operation of the apparatus is as follows:

The liquid supplied to the interior of the filter-chamber through the inlet-pipe $f$ will rise in the chamber, and coming in contact with the filter-covering will pass through the same to the interior of the filter and be thence conducted away to the point of discharge in a filtered condition through the discharge-pipe $i$. At the same time that this operation is being conducted the brushes will be vertically reciprocated over the filter-surface, with the result that all particles of metal and other foreign substances that may have been contained in the liquid and arrested by the filter-surface will be cleaned from that surface and will by their gravity fall downward into the depression $a^2$ in the base-plate A, whence they may be removed when desired through the plug $g$.

From the foregoing, therefore, it will be seen that I produce a filter and cleaning device therefor which, while simple in construction, insures not only of the thorough cleaning of the filter-surfaces, but a more efficient operation of the filter as a consequence thereof.

While in the foregoing I have shown the best means contemplated by me for carrying my invention into practice, I wish it distinctly understood that I do not limit myself thereto, as it is obvious that I may modify the same in many of its details without departing from the spirit of the invention.

Having now described my invention and specified certain of the ways in which it is or may be carried into effect, I claim and desire to secure by Letters Patent of the United States—

1. The combination, with a filter-chamber, a filter arranged therein, a cleaning-brush surrounding the filter for coöperation therewith, with its bristles extending inward from its back toward and in contact with the exterior of the filter and disposed at a less distance apart in the direction of the length of the brush than the length of its longitudinal traverse, of an eccentric, devices for operatively connecting this eccentric with the brush, and means for both conducting the liquid to be treated to the filter-chamber and the filtered liquid from the filter, substantially as described.

2. The combination, with a filter, a brush surrounding such filter and extending from near one of its ends to near its other, with its bristles extending inward from its back for coöperation with the exterior of the filter and disposed in parallel rows around the interior of its back at a less distance apart than the longitudinal travel of the brush, and an eccentric, of a bridge-piece connected with one end of the brush, an eccentric-strap, and a rod intermediate the eccentric-strap and the bridge-piece, substantially as described.

3. The combination, with a filter, a cleaning device surrounding such filter for coöperation with it and made up from independent longitudinal sections constructed with notched overlapping edges, of springs and coöperating appliances applied across these overlapping edges for pressing the sections of the cleaning devices inward against the filter with a yielding pressure, and means for imparting a longitudinal reciprocating motion to such cleaning devices along the filter, substantially as described.

In witness whereof I have hereunto set my hand this 3d day of February, 1904.

LÉON DION.

Witnesses:
J. B. McGIRR,
R. F. SWEENY.